United States Patent
Chung et al.

(10) Patent No.: US 8,375,211 B2
(45) Date of Patent: Feb. 12, 2013

(54) OPTIMIZATION OF SIGNING SOAP BODY ELEMENT

(75) Inventors: Hyen Vui Chung, Round Rock, TX (US); Takahide Nogayama, Yamato (JP); Gregory Louis Truty, Austin, TX (US); Kenichiro Ueno, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 12/427,095

(22) Filed: Apr. 21, 2009

(65) Prior Publication Data

US 2010/0268952 A1   Oct. 21, 2010

(51) Int. Cl.
*H04L 29/06* (2006.01)

(52) U.S. Cl. .......................... 713/170; 713/176

(58) Field of Classification Search ................... 713/170
See application file for complete search history.

(56) References Cited

U.S. PATENT DOCUMENTS

| | | |
|---|---|---|
| 5,371,794 A | 12/1994 | Diffie et al. |
| 5,475,757 A | 12/1995 | Kelly |
| 5,781,632 A | 7/1998 | Odom |
| 5,812,671 A | 9/1998 | Ross, Jr. |
| 5,960,086 A | 9/1999 | Atalla |
| 5,991,401 A | 11/1999 | Daniels et al. |
| 6,023,682 A | 2/2000 | Checchio |
| 6,081,601 A | 6/2000 | Raivisto |
| 6,084,969 A | 7/2000 | Wright et al. |
| 6,199,052 B1 | 3/2001 | Mitty et al. |
| 6,421,781 B1 | 7/2002 | Fox et al. |
| 6,526,506 B1 | 2/2003 | Lewis |
| 6,754,825 B1 | 6/2004 | Lennie et al. |

(Continued)

FOREIGN PATENT DOCUMENTS

| | | |
|---|---|---|
| KR | 1019990086998 A | 12/1999 |
| WO | 9416516 A1 | 7/1994 |

(Continued)

OTHER PUBLICATIONS

Kohring et al., "Non-Blocking Signature of Very Large SOAP Messages", IT Research Division, NEC Laboratories Europe Rathausallee 10, D-53757 Sankt Augustin, Germany, Sep. 17, 2007, pp. 1-13.

(Continued)

*Primary Examiner* — Kimyen Vu
*Assistant Examiner* — Randal Moran
(74) *Attorney, Agent, or Firm* — Yee & Associates, P.C.; David A. Mims

(57) ABSTRACT

An XML digital signature mechanism for providing message integrity. A sending party serializes a source XML document into a serialized byte array, calculates the source offset and length of the array of the signed part in the serialized byte array, and calculates a source hash value using the serialized array and the source offset and length. The serialized byte array is a non-canonicalized array. The array and source hash value used to sign a part or the whole of the serialized byte array is sent to a receiving party. The receiving party calculates the target offset and length of the signed part in the serialized byte array and calculates a target hash value of the signed part by using the array and the target offset and length. The receiving party compares the target hash value and the source hash value to verify the integrity of the target XML document.

20 Claims, 8 Drawing Sheets

U.S. PATENT DOCUMENTS

| | | | |
|---|---|---|---|
| 2002/0002675 A1 | 1/2002 | Bush | |
| 2002/0178370 A1 | 11/2002 | Gurevich et al. | |
| 2005/0021799 A1 | 1/2005 | Imamura et al. | |
| 2007/0180149 A1 | 8/2007 | Vernal et al. | |
| 2008/0005660 A1 | 1/2008 | Austel et al. | |
| 2008/0235258 A1* | 9/2008 | Chung et al. | 707/102 |
| 2008/0289039 A1* | 11/2008 | Rits et al. | 726/22 |
| 2009/0007253 A1 | 1/2009 | Chung et al. | |
| 2009/0282242 A1* | 11/2009 | Lortz | 713/157 |
| 2010/0082993 A1* | 4/2010 | Benameur et al. | 713/176 |
| 2010/0185845 A1* | 7/2010 | Takayama et al. | 713/2 |
| 2011/0035582 A1* | 2/2011 | Zheng | 713/152 |

FOREIGN PATENT DOCUMENTS

| | | |
|---|---|---|
| WO | 9501684 A1 | 1/1995 |
| WO | 0069114 A1 | 11/2000 |
| WO | 0101644 A1 | 1/2001 |

OTHER PUBLICATIONS

Lu et al., "A Streaming Validation Model for SOAP Digital Signature", Proceedings of the High Performance Distributed Computing, 2005. HPDC-14. Proceedings. 14th IEEE International Symposium, IEEE Computer Society Washington, DC, USA, 2005, pp. 1-10.

* cited by examiner

OPTIMIZATION OF SIGNING SOAP BODY ELEMENT

BACKGROUND

1. Field

The disclosure relates generally to network security, and more specifically to optimizing Extensible Markup Language (XML) digital signature processing for providing message integrity.

2. Description of the Related Art

Today, most computers are connected to some type of network. A network allows a computer to share information with other computer systems. Communication networks today must support exchange of sensitive information, electronic commerce, and a variety of other tasks. As networks are expected to ensure integrity and authenticity of exchanged data, there is a need for cryptographic tools that offer high security as well as high efficiency.

When a message is sent from one party to another, the receiving party may desire to determine whether the message has been altered in transit, as well as to be confident of the origin of the message. As a handwritten signature appended to a physical document may be used to authenticate the document, a digital signature may be used to authenticate electronic communications. A digital signature is generated by the document signer based on a hash value of the body of the message being signed. The sending party appends the digital signature to the electronic document, and the receiving party may use the digital signature to establish the sender's identity and the integrity of the transmitted document.

Digital signatures are based on an asymmetric cryptography method in which each user is assigned a pair of keys—a private key and a public key. The public key is generally accessible. The digital signature is generated by the sending party using the private key. The recipient of a document signed with the digital signature can extract the signature from the incoming document using the sending party's public key. The recipient may verify the integrity of the incoming document by comparing the sender's calculated hash value with the hash value calculated by the recipient from the incoming document.

Digital signatures may be generated using various known cryptographic methods, including the RSA (Rivest-Shamia-Adleman cryptographic algorithm) public key method. With RSA, a document extract value (hash) generated by a hashing method such as MD5 (Message Digest #5) or SHA-1 (Secure Hashing Algorithm) is signed with the private key of the sending party (encrypted) and appended to the document as a digital signature prior to transmitting the message.

SUMMARY

The illustrative embodiments provide a method and system for optimizing Extensible Markup Language (XML) digital signature processing for providing message integrity. A non-canonicalized serialized byte array and a source hash value are received. The non-canonicalized serialized byte array comprises a source extensible markup language document. The source hash value is calculated using the non-canonicalized serialized byte array, a source offset, and a source length value. The source hash value is an element in the extensible markup language digital signature used to sign a subset of the non-canonicalized serialized byte array. A "signed part" of the non-canonicalized serialized byte array may comprise a subset of the serialized byte array or the entire serialized byte array. Upon receiving the non-canonicalized serialized byte array and source hash value, the target offset and the target length value of the signed part in the non-canonicalized serialized byte array is calculated. A target hash value using the non-canonicalized serialized byte array, the target offset, and the target length value is then calculated. The target hash value and the source hash value is then compared to verify the integrity of the non-canonicalized serialized byte array.

DETAILED DESCRIPTION

Figure 1:
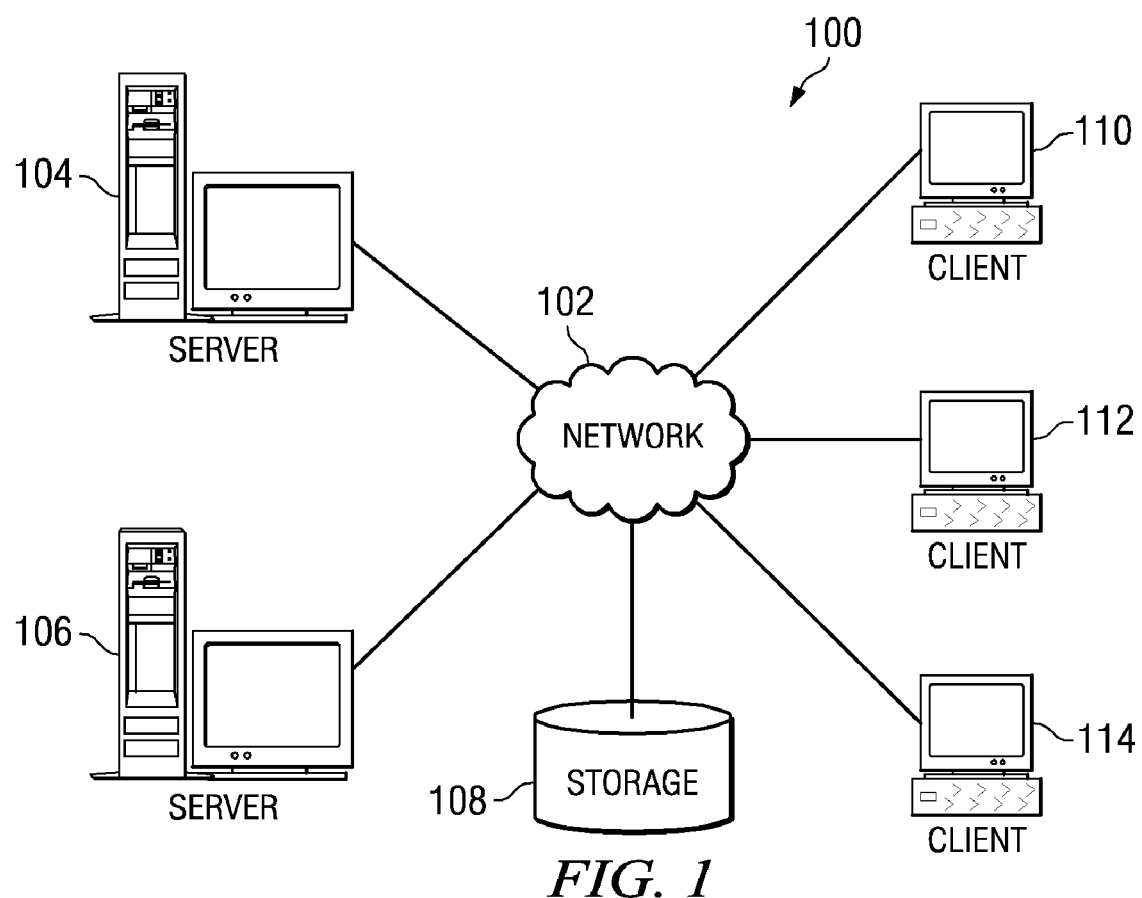
FIG. 1 depicts a pictorial representation of a distributed data processing system in which the illustrative embodiments may be implemented.

As will be appreciated by one skilled in the art, the embodiments of the disclosure may be embodied as a system, method or computer program product. Accordingly, the embodiments of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments of the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wired line, optical fiber cable, RF, etc.

Computer program code for carrying out operations of the embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
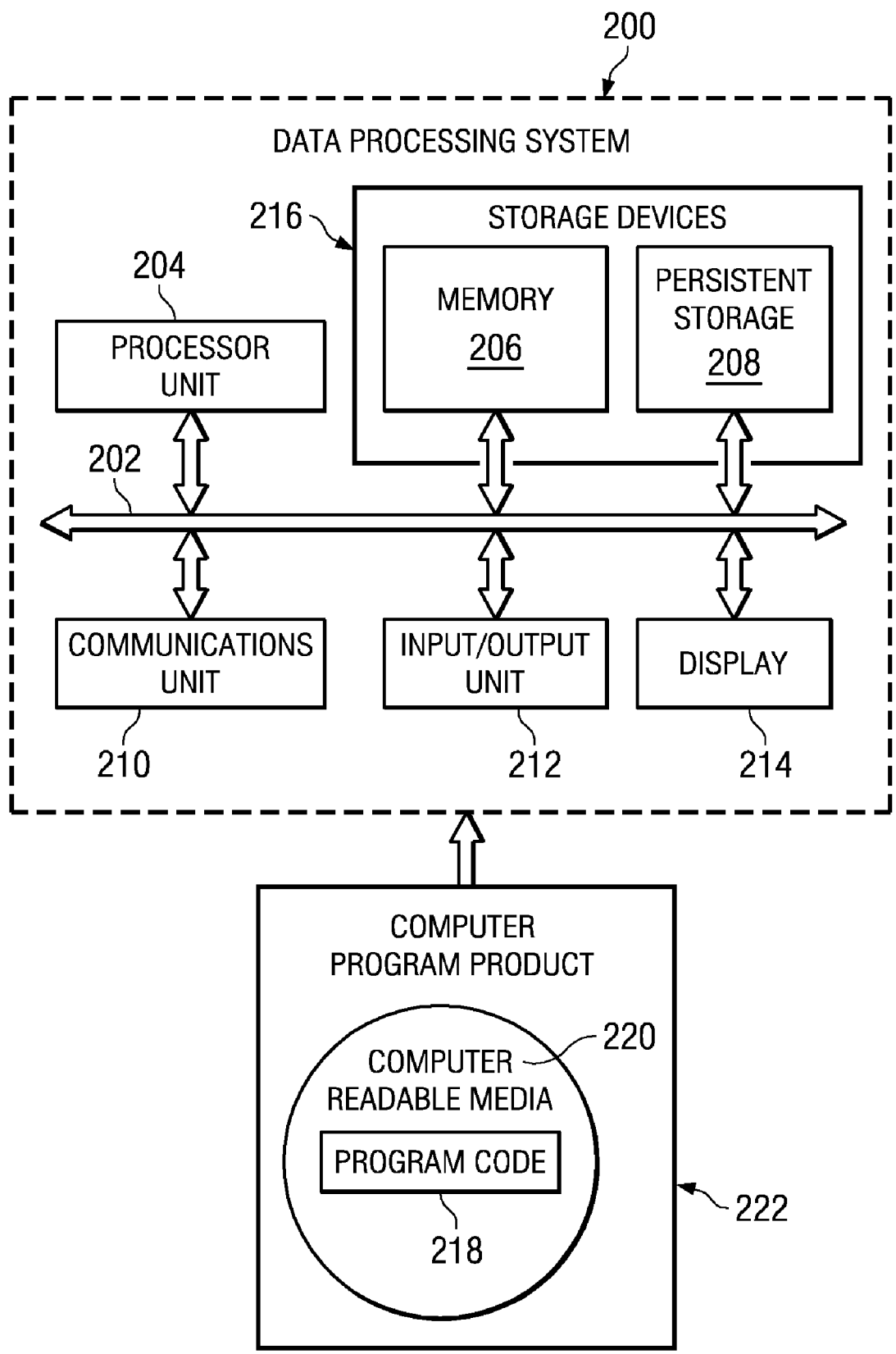
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The World Wide Web Consortium (W3C) standard body defines message protection standards like XML Digital Signature (http://www.w3.org/TR/xmldsig-core/) or XML Encryption (http://www.w3.org/TR/xmlenc-core/). XML digital signature provides message layer security or end-to-end integrity protection between the message source and the message final destination. The XML digital signature is a W3C standard that defines how to digitally sign an XML document. The integrity of an XML message may be verified using digital signature by comparing the hash value of the outgoing message as calculated by the sending party and the hash value of the incoming message as calculated by the receiving party. If the two hash values are the same, the parties may conclude that the XML message has not been altered during transit.

When signing a message with an XML digital signature, the sending party first parses and serializes the XML document by storing the state of the document in binary form as a byte array. During the XML parsing and serialization, superficial differences may be introduced into the serialized document, which do not affect the body of the document. For example, the order of attributes for a start tag in one XML document may be A, B, C, while the order of the same attributes for a start tag in a semantically equal XML document is B, C, A. Thus, although the two XML documents comprise the same content, the fact that the XML documents may be expressed in different serialized formats presents a problem when using a single hash value for an XML document for verification purposes. A digital signature is created using an asymmetric key algorithm (typically RSA), to encrypt the results of running the serialized XML document through a cryptographic hash function (typically SHA-1), any difference between the serialized representations of the XML document will cause the digital signatures to vary between the sending and receiving parties.

To address the issue of having more than one serialized representation of a given XML document, XML Canonicalization (abbreviated C14N) is a set of rules for converting an XML document that has more than one possible representation into a "standard" canonical representation. The canonicalization process is used to transform the target portion of an XML document into a standard format according to the set of canonicalization rules before the hash value of the XML document is calculated, and this standard canonical representation is what is signed. Thus, XML documents which contain the same content will be converted into the same canonicalized XML message. Canonicalization is needed because the message of a web service may be transferred through intermediaries between the message source and the message destination. In the absence of canonicalization, when an intermediary receives a message, the intermediary may deserialize the message into an XML data model (e.g., DOM), then serialize the message back into a byte array and send the message to other intermediary or the receiving party. In this situation, there is a possibility that the serialized message format may be changed, but still contain the same message content. However, since the format of the serialized message has changed, the same digital signature generated at the message source cannot be produced from the XML document at the final destination. By transforming the XML document into a standard form using canonicalization, the hash value calculated from the canonicalized XML message by the sending party is ensured to be the same as the hash value calculated from the canonicalized XML message at the final destination, even if the XML message is serialized and deserialized multiple times during transit.

A drawback to canonicalization is that the transformation process is CPU intensive and costly in memory utilization. The canonicalization process is also slow, as the process is creating another form (representation) of the data in memory for an XML message. In addition, canonicalization is performed on an XML message even if the XML message is not changed by an intermediary's serialization, or even when there are no intermediaries in the message path.

The illustrative embodiments provide an improved XML digital signature algorithm which provides integrity protection of XML messages of web services, while overcoming the CPU usage and memory utilization drawbacks of existing XML digital signature algorithm which employ canonicalization. Web services systems in the art today often comprise architectures that do not use intermediaries between the message source and the final destination. In architectures where these web services systems do utilize intermediaries, the intermediaries are simple intermediaries such as HTTP servers, which may access the message header for routing purposes, but do not actually change the body of the XML message. The body is the essential data that is being carried within a message packet to the receiving party (typically, the body does not include the metadata required to get the packet to its destination). The XML digital signature algorithm takes advantage of these web services system architectures characteristics to optimize existing XML digital signature processing by eliminating XML canonicalization when there are no intermediaries or only simple intermediaries between the message source and the final destination.

The XML digital signature algorithm in the illustrative embodiments makes an assumption that an XML message does not pass through intermediaries between the message source and the final destination, or if the web services system does utilize intermediaries, the intermediaries are simple intermediaries that do not change the body of the XML message. Thus, the XML digital signature algorithm in the illustrative embodiments is applicable in any web services system comprising an architecture that does not utilize intermediaries or uses only simple intermediaries that do not deserialize and then serialize the message. Since there are no intermediaries in the message path which will deserialize and then serialize the message in transit, the XML digital signature algorithm in the illustrative embodiments does not need to be concerned with the possible multiple serialized formats of a message. As no deserialization and serialization is performed by intermediaries in the message path, the XML digital signature algorithm may treat the body or payload of the message as binary data at both the sending party and the receiving party, rather than XML data that requires canonicalization. Binary data is composed of one or more bytes of raw data. In contrast with XML data which is serialized from some form of Object Model (e.g., DOM or AXIOM) that can be represented in multiple serialized formats, binary data is treated as a single object (or entity) which enables the algorithm to sign or encrypt the binary data to operate on the entire message, without requiring an understanding of the data. Treating the message data as binary data eliminates the problems caused by having multiple serialized formats when treating the message data as XML data. Consequently, the receiving party does not need to canonicalize the incoming XML message, but only needs to verify whether the XML message serialized by sending party was changed or modified in transit to the receiving party. Thus, The XML digital signature algorithm in the illustrative embodiments provides the benefit of integrity protection at the message level to provide the benefit of end-to-end security from the XML message source to the message final destination, as well as the performance benefits of avoiding the expensive canonicalization required by existing XML digital signature algorithms to be performed in the body of the message.

Figure 3:
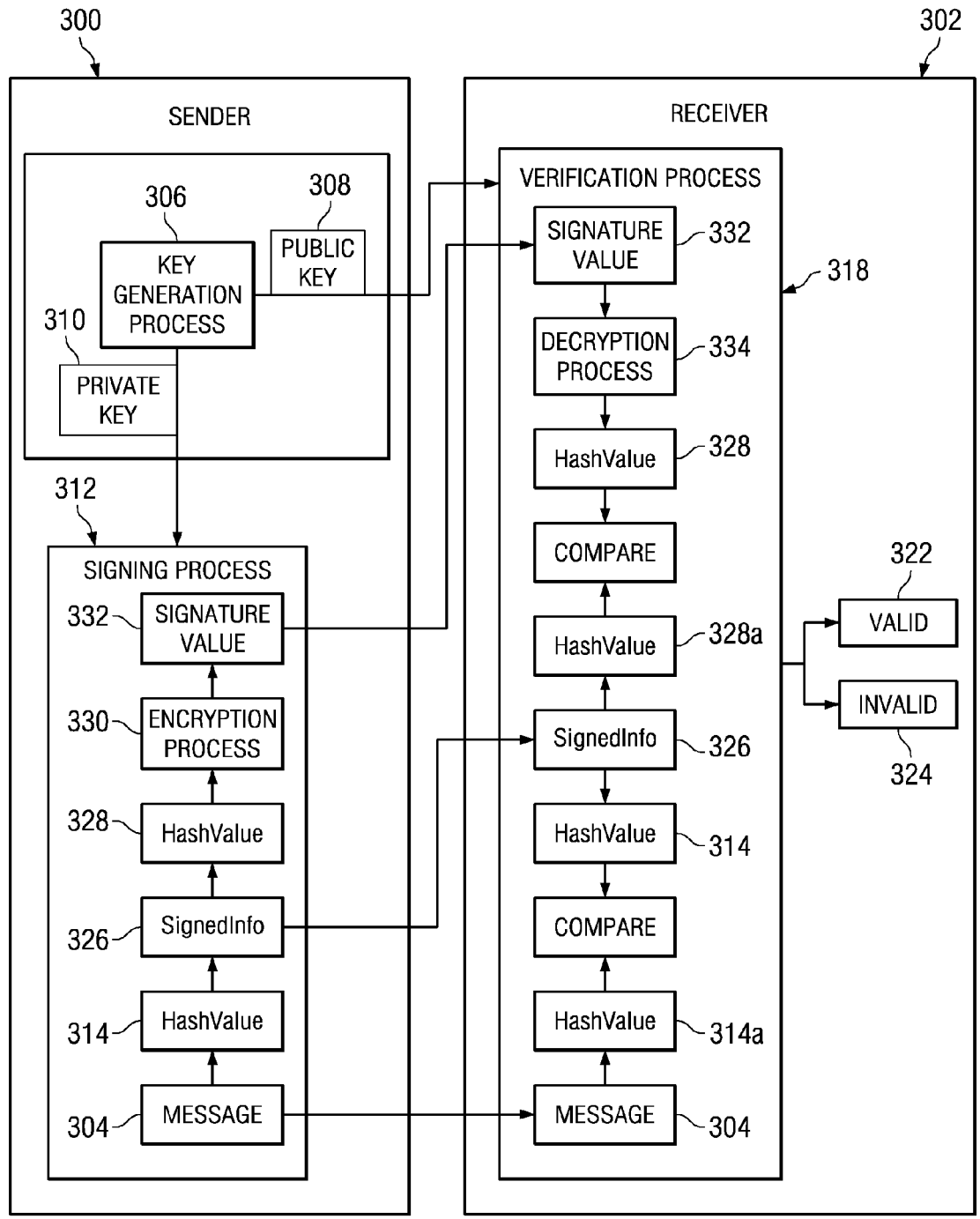
FIG. 3 is a block diagram illustrating a general scheme for verifying messages between a sender and a receiver.

Turning now to FIG. 3, a block diagram illustrating a general scheme for verifying messages between a sender and a receiver is shown. Sender 300 is a computing device requesting to access and/or execute an application provided on receiver 302. Sender 300 may be implemented using any type of computing device, such as a personal computer, laptop, personal digital assistant, or any other computing device depicted in FIGS. 1 and 2. In this example, sender 300 is a client computing device, such as client 110 in FIG. 1.

Receiver 302 is a computing device providing access to an application (such as a web services application) located on or locally to receiver 302. Receiver 302 may be implemented using any type of computing device, such as a personal computer, laptop, personal digital assistant, or any other computing device depicted in FIGS. 1 and 2. In this example, receiver 302 is a web services server, such as server 104 in FIG. 1.

Sender 300 is connected to receiver 302 by a network connection, such as network 102 in FIG. 1. In this example, the network is the Internet, and sender 300 may request to access and/or execute a web services application associated with receiver 302 by sending a web services request to receiver 302. Simple Object Access Protocol (SOAP) Web services comprise a collection of protocols and standards for enabling an application on one computer to interact and exchange data with one of more other applications on other computers over the Internet. Web service applications are not limited to any one operating system platform or programming language for applications to communicate and exchange data. For example, encoding web services messages in extensible markup language (XML) using SOAP enables an application on a computer running a Unix® operating system to interact with an application associated with a computer running a Windows® operating system. Web services may exchange XML documents and messages over the Internet using standards such as, for example, Simple Object Access Protocol (SOAP) over Hypertext Transfer Protocol (HTTP) bindings. SOAP is a method of packaging data before transmitting it across a network. SOAP may be thought of as an envelope that encloses an XML message. HTTP is a transport protocol that delivers data across the network. Thus, in one example, a web service invocation may comprise a first application (hereinafter referred to as the "sender") sending an XML message, which is packaged in a SOAP "envelope," across the network via HTTP to a second application (hereinafter referred to as the "receiver").

The SOAP Web services request may be secured using Web Services Security (a.k.a. WS-Security), which is a communications protocol built on W3C XML digital signature and XML encryption standards to provide message integrity and confidentiality respectively. In a one-time preliminary operation in sending WS-Security secured messages to receiver 302, sender 300 may use a key generation process 306 to generate a public key 308 and a private key 310. The public and private keys are generated only one time, not for each message transaction and generally performed as an out of band process. Public key 308 is made available to receiver 302 before any messages are sent. Mechanisms to supply the public key to the receiver 302 are well known in the art, and are not discussed in this patent. Private key 310 is kept secret by sender 300. In a typical process, sender 300 may request an external certification authority issue a signed public certificate that contains the sender's public key. During the verification process, receiver 302 may check the signature of the public certificate to verify the sender's identity.

Sender 300 uses digital signature signing process 312 to protect the integrity of each outgoing message (e.g., message 304) sent to receiver 302. Sender 300 calculates a hash value 314 of the body or payload of outgoing message 304. Sender 300 creates SignedInfo element 326 in the XML digital signature and writes hash value 314 in the SignedInfo element. Hash value 314 is used for verifying the integrity of the XML message. SignedInfo element 326 may have several hash values for message 304. Sender 300 then calculates hash value 328 from SignedInfo element 326. Sender 300 encrypts hash value 328 using private key 310 in encryption process 330 to create an encrypted hash value, or signature value 332. Signature value 332 is used for verifying the authenticity of the XML message using private/public keys. The output of the digital signature signing process 312 comprises signature value 332 and SignedInfo element 326. This output is sent to receiver 302 on outgoing message 304. Sender 300 may use conventional communication equipment to transmit outgoing message 304 to receiver 302.

In digital signature verification process 318, receiver 302 calculates a hash value 314a from incoming message 304. Receiver 302 extracts a hash value 314 from SignedInfo element 326 on the incoming message and compares the hash value 314 and the hash value 314a to verify the integrity of the message. Receiver 302 also calculates a hash value 328a from SignedInfo 326 and decrypts a hash value 328 on the incoming message using the sender's public key 308 through decryption process 334. Receiver 302 compares hash value 328 and the hash value 328a to verify the authenticity of the message. The output of verification process 318 signifies that the integrity of message 304 is valid 322 if hash values 314 and 314a are the same and invalid 324 if the hash values are different. Likewise, the authenticity of message 304 is valid 322 if hash values 328 and 328a are the same and invalid 324 if the hash values are different.

Figure 4:
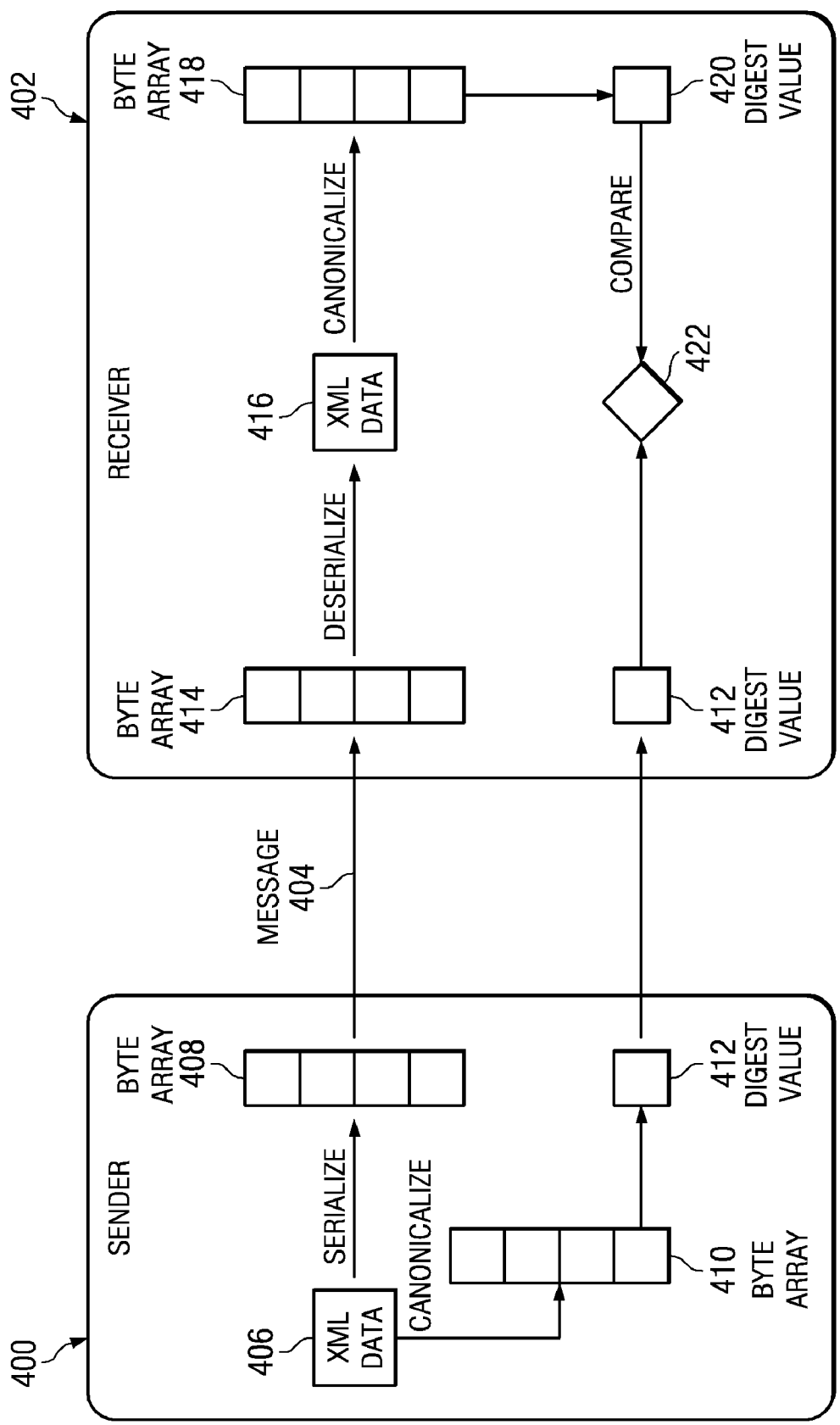
FIG. 4 is a block diagram illustrating a high level overview of a known digital signature algorithm for verifying XML messages using canonicalization.

FIG. 4 illustrates a high level overview of a known digital signature algorithm for verifying XML messages using canonicalization. The XML digital signature algorithm in FIG. 4 employs message layer security, in which all of the information related to message security, is encapsulated in the message itself.

Sender 400 sends XML message 404 to receiver 402. To protect the integrity of message 404, sender 400 serializes XML data 406 and stores the data as byte array 408. Serializing XML data 406 stores the state of the document in binary form as a byte array 408. Sender 400 also canonicalizes XML data 406 to transform the data into a standard format according to a set of canonicalization rules. The canonicalized XML data is stored as byte array 410. Sender 400 then calculates a hash value 412 of the canonicalized XML data. Sender may create a digital signature by signing the hash value 412 using the private key of sender 400. Sender 400 then sends message 404 to receiver 402.

Receiver 402 receives message 404 and stores the message as byte array 414. To verify the integrity of message 404, receiver 402 extracts XML data 416 from the byte array 414 by deserializing message 404 from byte array into an XML data object model 416 (e.g., DOM). Receiver 402 canonicalizes XML data object model 416 to transform the data into a normalized format according to a set of canonicalization rules (e.g., C14N), and stores the canonicalized XML data as byte array 418. Once the XML data is canonicalized, receiver 402 calculates a hash value 420 of the body or payload of the canonicalized XML data as byte array 418. Receiver 402 compares hash value 412 calculated at sender 400 against hash value 420 calculated at receiver 402 to verify the integrity of message 404. If hash value 412 is the same as hash value 420, the result 422 of the comparison indicates that the integrity of message 404 is valid.

Figure 5:
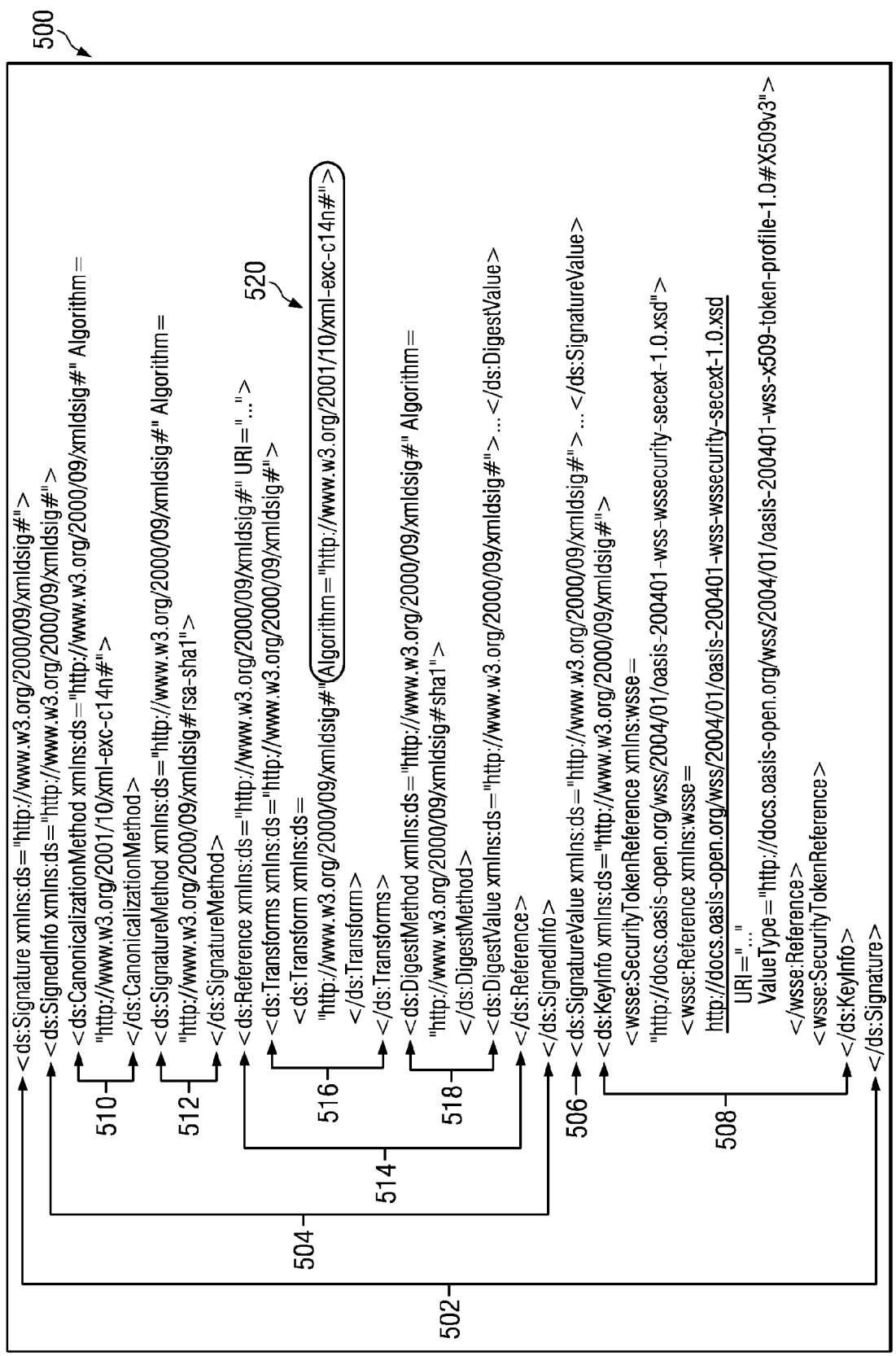
FIG. 5 illustrates an example of a signature element in an XML message using an XML digital signature algorithm with canonicalization.

FIG. 5 illustrates an example of a digital signature element in an XML message using an XML digital signature algorithm with canonicalization. Digital signature 500 is an example XML digital signature output that is created and encapsulated in a SOAP message, such as message 404 in FIG. 4. Digital signature 500 is represented as <ds:Signature> XML element 502. Top level <ds:Signature> XML element 502 includes information on which parts of the message have been signed (<ds:SignedInfo> element 504), the value of the encrypted hash of the SignedInfo element (<ds:SignatureValue> element 506), and the public key to be used to validate the signature (<ds:KeyInfo> element 508).

<ds:SignedInfo> element 504 specifies how a hash value may be recreated by the receiver to verify the message and is protected by using the public/private key digital signature framework. <ds:SignedInfo> element 504 contains information about the canonicalization process used (<ds:CanonicalizationMethod> element 510), the signature type used (<ds:SignatureMethod> element 512), and uniform resource identifier reference values that references signed parts of the message (<ds:Reference> elements 514). <ds:CanonicalizationMethod> element 510 in <ds:SignedInfo> element 504 specifies the algorithm used to canonicalize <ds:SignedInfo> element 504 before calculating the hash value of <ds:SignedInfo> element 504. As data having the same XML content may have different textual representations, the XML data is first canonicalized to standardize the data before a hash value is created for the signature. When the hash value of <ds:SignedInfo> element 504 is calculated, the hash value of <ds:SignedInfo> element 504 is also encrypted and then written to <ds:SignatureValue> element 506 as the signature value. <ds:SignatureMethod> element 512 identifies the algorithm used to generate the encrypted hash value of the <ds:SignatureValue> element 512. Examples of signature algorithms include, for example, DSA (digital signature algorithm) and RSA (Rivest, Shamir, and Adleman) digital signature process.

<ds:Reference> element 514 identifies the signed portions or elements of the XML message using the web security utility <wsu:Id> attribute. Thus, <ds:Reference> element 514 references a signed data element for which a hash value was calculated. Hash values of the signed parts specified in <ds:Reference> element 514 are calculated and the digital signature specified in <ds:Signature> element 502 is verified using the sender's public key. <ds:SignedInfo> element 504 may contain multiple <ds:Reference> elements, and the message body or payload is one of the <ds:Reference> elements. <ds:Reference> element 514 includes <ds:Transform> element 516 and <ds:DigestMethod> element 518. <ds:DigestMethod> element 518 indicates the hashing algorithm to be used to create the hash value. <ds:Transform> element 516 specifies the transformation algorithm attribute to be applied to the XML document before the hash of the XML document is calculated. In digital signature 500, <ds:Transform> element 516 specifies that the canonicalization (C14N) algorithm 520 is used to transform the XML document into a standard format prior to creating the hash value. Canonicalization algorithm 520 in <ds:Transform> element 516 of <ds:Reference> element 514 is used to canonicalize the signed XML elements before calculating the hash values. Canonicalization (C14N) algorithm 520 is required to be used in digital signature 500 to normalize the XML document, since intermediaries that receive the XML document may deserialize and serialize the message multiple times during transit, which can introduce different forms of the serialized message. While these differences do not affect the content of the XML document, the serialization and deserialization processes performed by the intermediaries may prevent the XML document from being verified at the final destination, since the same hash values calculated from the XML document at the message source may not be produced from the XML document at the final destination.

Figure 6:
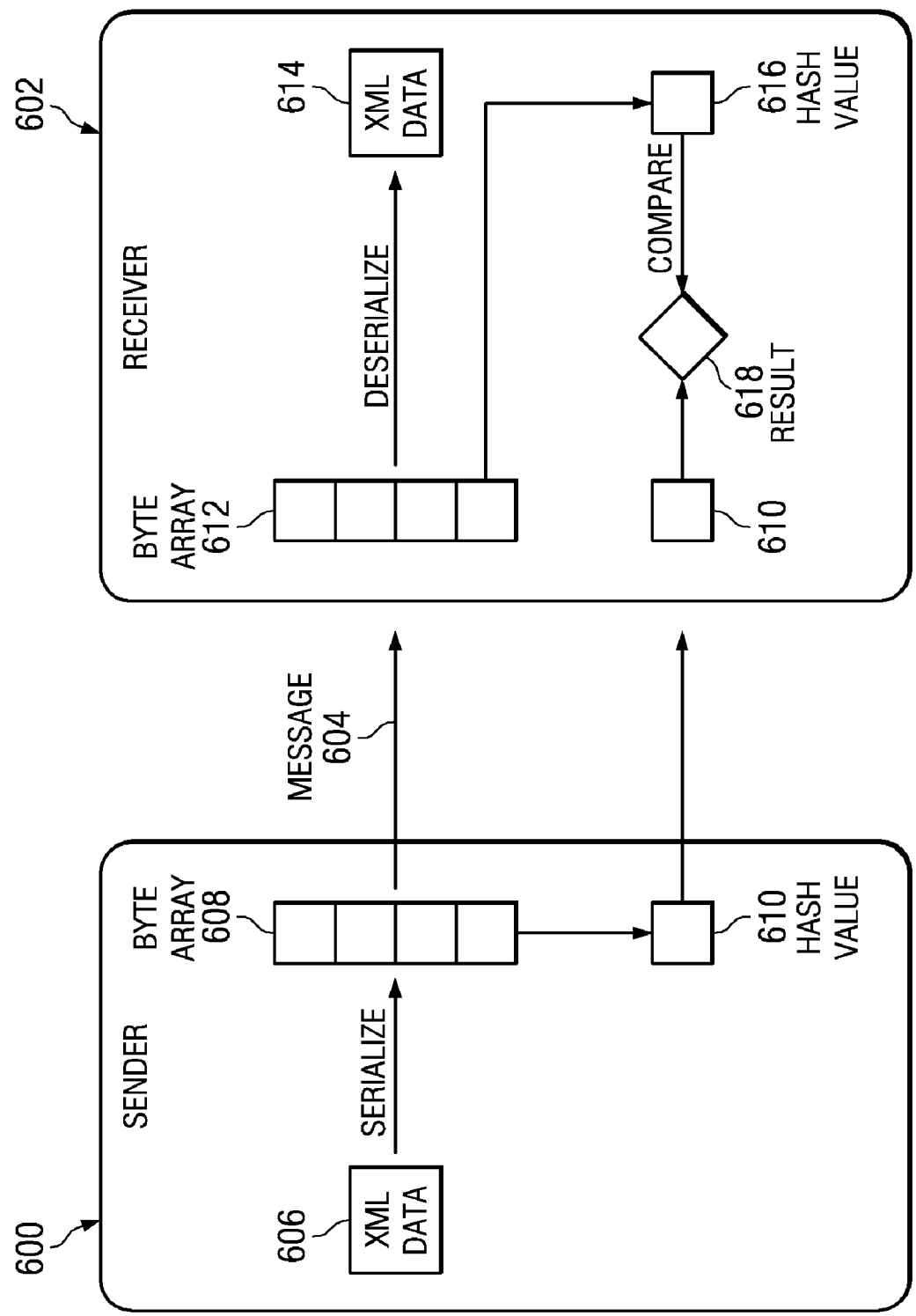
FIG. 6 is a block diagram illustrating a high level overview of a digital signature algorithm for verifying XML messages without canonicalization in accordance with the illustrative embodiments.

FIG. 6 is a block diagram illustrating a high level overview of a digital signature algorithm for verifying XML messages without canonicalization in accordance with the illustrative embodiments. The digital signature algorithm eliminates the canonicalization processes used in existing XML digital signature algorithms, such as the XML digital signature algorithm in FIG. 4. The digital signature algorithm may be implemented in web services systems having architectures that have no intermediaries between the message source and the final destination, or that have only simple intermediaries that access the message for routing purposes but do not change the body of the message. In such web services systems, canonicalization processes are not needed in the SOAP body of the message since no deserialization or serialization by intermediaries which change the XML message body is performed.

Sender 600 sends XML message 604 to receiver 602. Sender 600 protects the integrity of message 604 by serializing XML data 606 and storing the data in binary form as byte array 608. Instead of canonicalizing XML data 606, sender 600 calculates a hash value 610 of XML data 606. Hash value 610 may be calculated using the byte array 608 and the offset and length of the outgoing message body. The offset is used to locate the body or payload of the message within the byte array. Sender 600 may transform hash value 610 using the private key of sender 600 into a digital signature, and append the digital signature containing hash value 610 to message 604. Sender 600 sends message 604 to receiver 602.

Receiver 602 receives message 604 and stores the message as byte array 612. To verify the integrity of message 604, receiver 602 calculates a hash value 616 of byte array 612 without canonicalizing byte array 612. Hash value 616 may be calculated using byte array 612 and the offset and length of the incoming message body. Receiver 602 obtains hash value 610 of the body or payload of the message from the SignedInfo element and compares hash value 610 calculated at sender 600 against hash value 616 calculated at receiver 602 to verify the integrity of message 604. Receiver 602 verifies that the integrity of message 604 is valid if result 618 of the comparison indicates that all of the hash values match. Receiver 602 may deserialize message 604 after the message body has been verified. Receiver 602 may deserialize message 604 as byte array 612 and extract the XML data 614 from the series of bytes if the web services application needs the XML data. If the application does not need the XML data, byte array 612 will not be deserialized.

Figure 7:
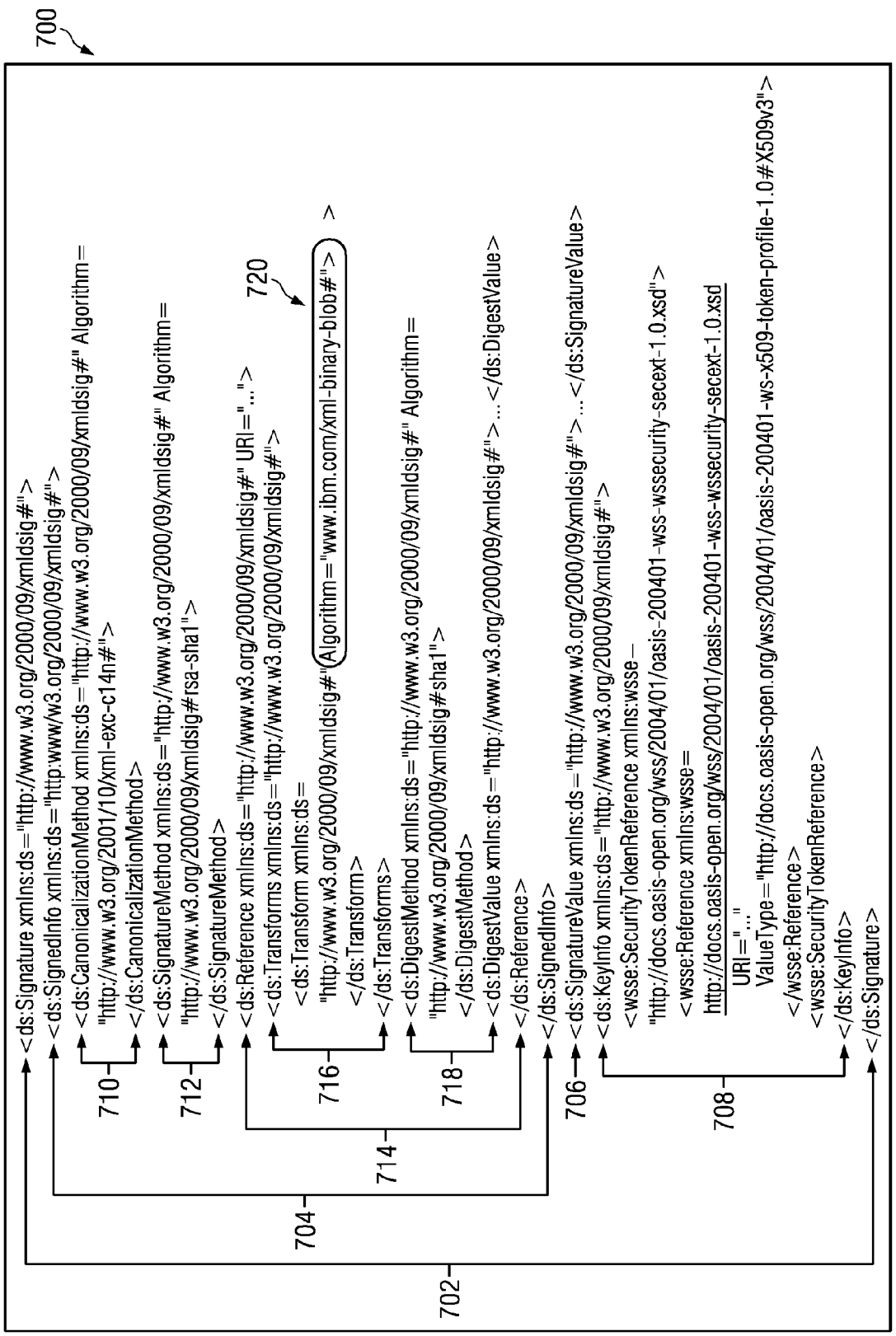
FIG. 7 illustrates an example of a signature element in an XML message using an XML digital signature algorithm without canonicalization in accordance with the illustrative embodiments.

FIG. 7 illustrates an example of a signature element in an XML message using an XML digital signature algorithm without canonicalization in accordance with the illustrative embodiments. Digital signature 700 is an example XML digital signature output that is created and encapsulated in an XML message such as message 604 in FIG. 6. Like digital signature 500 in FIG. 5, digital signature 700 includes a <ds:Signature> element 702, <ds:SignedInfo> element 704, <ds:SignatureValue> element 706, <ds:KeyInfo> element 708, <ds:CanonicalizationMethod> element 710, <ds:SignatureMethod> element 712, <ds:Reference> element 714, and <ds:DigestMethod> element 718. These elements in digital signature 700 comprise the same algorithms as illustrated in digital signature 500 in FIG. 5.

The output in digital signature 700 differs from digital signature 500 in FIG. 5 in the algorithms used to transform the XML data before the signed XML data is hashed. In digital signature 500 in FIG. 5, <ds:Transform> element 516 specifies that the canonicalization (C14N) algorithm is used to transform the target XML document portions identified in <ds:Reference> element 714 into a standard format. The canonicalization process is required in digital signature 500 to ensure that the XML document can be verified at the final destination. However, in digital signature 700, no canonicalization process is required since no serialization or deserialization processes (which can change the XML message) are performed in the body or payload of the XML document by any intermediaries in the web services system. Rather, <ds:Transform> element 716 specifies that the transformation process to be applied to the XML message is a binary data algorithm 720. In this illustrative example, the binary data algorithm comprises uniform resource identifier "http://www.ibm.com/xml-binary-blob#". Thus, as shown in digital signature 700, neither the sending party nor the receiving party performs the expensive canonicalization processes, and the content of the XML message is treated as binary data, rather than XML data. Thus, the algorithm specified in <ds:Transform> element 516 essentially indicates how the byte array should be prepared before calculating the hash value. If the transform algorithm specifies a canonicalization algorithm, then the target XML portion of the byte array is serialized using the canonicalization algorithm before calculating the hash value. However, if the transform algorithm does not specify a canonicalization algorithm but rather a binary data algorithm, the byte array which is on the wire is used to calculate the hash value.

Figure 8:
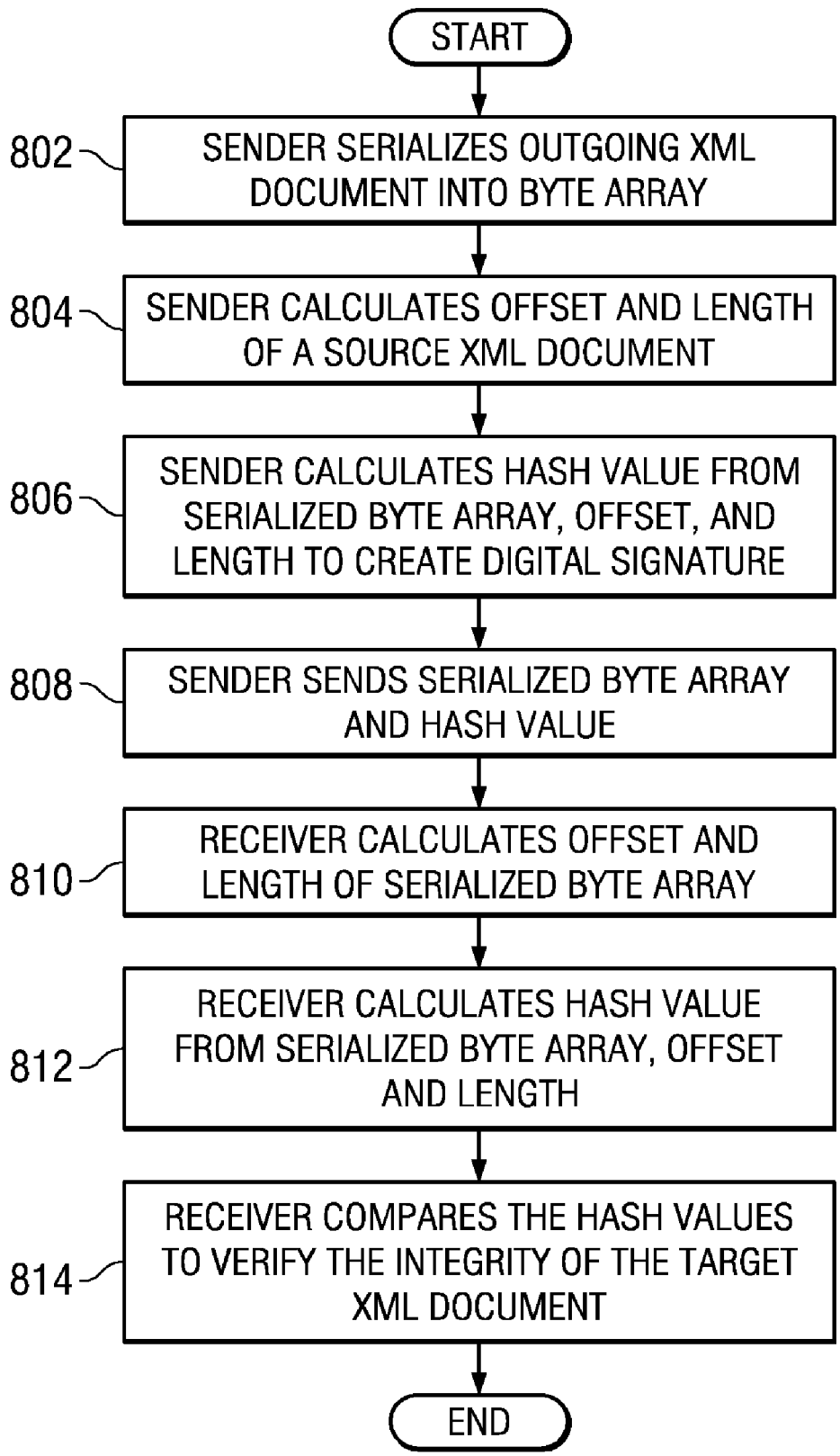
FIG. 8 is a flowchart of a process for optimizing XML digital signature processing in accordance with the illustrative embodiments.

FIG. 8 is a flowchart of a process for optimizing XML digital signature processing in accordance with the illustrative embodiments. The process described in FIG. 8 may be implemented in web services systems having architectures that have no intermediaries between the message source and the final destination, or that have only simple intermediaries that access the message for routing purposes but do not change the body of the message. The process described in FIG. 8 eliminates the costly canonicalization processes required for the signed part (in this case the SOAP Body element) in existing XML digital signature algorithms.

The process begins with the sending party in an XML transaction serializing a source XML document into a byte array (step 802). The sending party then calculates the offset value and length of the source XML document of the serialized byte array (step 804). The offset value of the serialized byte array indicates the beginning of the SOAP body element of the message. The length of the serialized byte array indicates the total length of the document body or payload in bytes. The sending party calculates a hash value from the serialized byte array, and the offset and length of the serialized byte array (step 806). The sending party then sends the serialized byte array, the calculated hash value, and the target scope identifier to a receiving party (step 808). The target scope identifier comprises the starting position and the length of the protected part of the message in the serialized byte array.

Upon receiving the serialized byte array from the sending party, the receiving party calculates the offset and length of the serialized byte array (step 810). The receiving party also calculates the hash value from the serialized byte array, and the offset and length of the serialized byte array (step 812). The receiving party may verify the integrity of the serialized byte array by comparing the hash value received with the serialized byte array and the hash value calculated by the receiving party (step 814). The integrity of the serialized byte array is determined to be valid if the hash values are the same, or invalid if the hash values are different. Once the serialized byte array is verified, the receiver may deserialize the byte array and extract the XML data from the series of bytes if the web services application needs the XML data. If the application does not need the XML data, the byte array is not deserialized.

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments of the disclosure were chosen and described in order to best explain the principles of the disclosure and the practical application, and to enable others of ordinary skill in the art to understand the disclosure for various embodiments with various modifications as are suited to the particular use contemplated.

The embodiments of the disclosure can take the form of an entirely hardware embodiment, an entirely software embodiment or an embodiment containing both hardware and software elements. In a preferred embodiment, the embodiments of the disclosure is implemented in software, which includes but is not limited to firmware, resident software, microcode, etc.

Furthermore, the embodiments of the disclosure can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The embodiments of the disclosure can also take the form of a computer program product which has been downloaded over a network from one device to another for use in the other device. For instance, the program code stored in a computer readable storage medium in a server data processing system may be downloaded over a network from the server to a remote data processing system, such as a client or another server. Likewise, the program code stored in a computer readable storage medium in a client data processing system may be downloaded over a network from the client to a remote data processing system, such as a server or another client.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the embodiments of the disclosure has been presented for purposes of illustration and description, and is not intended to be exhaustive or limited to the embodiments in the form disclosed. Many modifications and variations will be apparent to those of ordinary skill in the art. The embodiment was chosen and described in order to best explain the principles of the disclosure, the practical application, and to enable others of ordinary skill in the art to understand the disclosure for various embodiments with various modifications as are suited to the particular use contemplated.

What is claimed is:

1. A computer implemented method for processing an extensible markup language digital signature, the computer implemented method comprising:
    receiving a non-canonicalized serialized byte array and a source hash value, wherein the non-canonicalized serialized byte array comprises a source extensible markup language document, wherein the source hash value is calculated using the non-canonicalized serialized byte array, a source offset that indicates a beginning of the source extensible markup language document, and a source length value that indicates a total length of one of the source extensible markup language document or a payload, and wherein the source hash value is an element in the extensible markup language digital signature used to sign a subset of the non-canonicalized serialized byte array;
    calculating, by a computer, a target offset and a target length value of a signed part in the non-canonicalized serialized byte array;
    calculating a target hash value using the non-canonicalized serialized byte array, the target offset, and the target length value; and
    verifying an integrity of the non-canonicalized serialized byte array by comparing the target hash value and the source hash value.

2. The computer implemented method of claim 1, wherein verifying the integrity of the serialized byte array further comprises:
    determining the non-canonicalized serialized byte array is valid if the target hash value matches the source hash value; and
    determining the non-canonicalized serialized byte array is invalid if the target hash value does not match the source hash value.

3. The computer implemented method of claim 1, wherein the source extensible markup language document comprises a request for a web service.

4. The computer implemented method of claim 1, further comprising: responsive to verifying the integrity of the non-canonicalized serialized byte array, deserializing the non-canonicalized serialized byte array into a target extensible markup language document.

5. The computer implemented method of claim 1, wherein a communications path between the sending party and the receiving party comprises intermediaries, and wherein no deserialization or serialization of the serialized byte array is performed by the intermediaries.

6. The computer implemented method of claim 1, wherein a reference element in the extensible markup language digital signature used to sign a subset of or the whole of the serialized byte array comprises a character array for a transformation algorithm that specifies the serialized byte array is handled as binary data.

7. The computer implemented method of claim 1, wherein the target hash value is calculated without canonicalizing the non-canonicalized serialized byte array.

8. An apparatus comprising:
    a bus;
        a storage device connected to the bus, wherein the storage device contains computer usable code;
        at least one managed device connected to the bus;
    a communications unit connected to the bus; and
    a processing unit connected to the bus, wherein the processing unit executes the computer usable code to receive a non-canonicalized serialized byte array and a source hash value, wherein the non-canonicalized serialized byte array comprises a source extensible markup language document, wherein the source hash value is calculated using the non-canonicalized serialized byte array, a source offset that indicates a beginning of the source extensible markup language document, and a source length value that indicates a total length of one of the source extensible markup language document or a payload, and wherein the source hash value is an element in the extensible markup language digital signature used to sign a subset of the non-canonicalized serialized byte array; calculate a target offset and a target length value of a signed part in the non-canonicalized serialized byte array; calculate a target hash value using the non-canonicalized serialized byte array, the target offset, and the target length value; and compare the target hash value and the source hash value to verify an integrity of the non-canonicalized serialized byte array.

9. The apparatus of claim 8, wherein the computer usable code to verify the integrity of the serialized byte array further comprises computer usable code to determine the non-canonicalized serialized byte array is valid if the target hash value matches the source hash value, and determine the non-canonicalized serialized byte array is invalid if the target hash value does not match the source hash value.

10. The apparatus of claim 8, wherein the processing unit further executes the computer usable code to deserialize the non-canonicalized serialized byte array into a target extensible markup language document in response to verifying the integrity of the serialized byte array.

11. The apparatus of claim 8, wherein a communications path between the sending party and the receiving party comprises intermediaries, and wherein no deserialization or serialization of the serialized byte array is performed by the intermediaries.

12. The apparatus of claim 8, wherein a reference element in the extensible markup language digital signature used to sign a subset of the serialized byte array comprises a character array for a transformation algorithm that specifies the serialized byte array is handled as binary data.

13. The apparatus of claim 8, wherein the target hash value is calculated without canonicalizing the non-canonicalized serialized byte array.

14. A computer program product for processing an extensible markup language digital signature in a non-transitory computer recordable storage medium having computer usable program code stored thereon, the computer usable program code for execution by a computer, comprising:

computer usable program code for receiving a non-canonicalized serialized byte array and a source hash value, wherein the non-canonicalized serialized byte array comprises a source extensible markup language document, wherein the source hash value is calculated using the non-canonicalized serialized byte array, a source offset that indicates a beginning of the source extensible markup language document, and a source length value that indicates a total length of one of the source extensible markup language document or a payload, and wherein the source hash value is an element in the extensible markup language digital signature used to sign a subset of the non-canonicalized serialized byte array;

computer usable program code for calculating a target offset and a target length value of a signed part in the non-canonicalized serialized byte array;

computer usable program code for calculating a target hash value using the non-canonicalized serialized byte array, the target offset, and the target length value; and computer usable program code for comparing the target hash value and the source hash value to verify an integrity of the non-canonicalized serialized byte array.

15. The computer program product of claim 14, wherein the computer usable program code for verifying the integrity of the serialized byte array further comprises:

computer usable program code for determining the non-canonicalized serialized byte array is valid if the target hash value matches the source hash value; and computer usable program code for determining the non-canonicalized serialized byte array is invalid if the target hash value does not match the source hash value.

16. The computer program product of claim 14, wherein the source extensible markup language document comprises a request for a web service.

17. The computer program product of claim 14, further comprising: computer usable program code for deserializing the non-canonicalized serialized byte array into a target extensible markup language document in response to verifying the integrity of the serialized byte array.

18. The computer program product of claim 14, wherein a communications path between the sending party and the receiving party comprises intermediaries, and wherein no deserialization or serialization of the serialized byte array is performed by the intermediaries.

19. The computer program product of claim 14, wherein a reference element in the extensible markup language digital signature used to sign a subset of the serialized byte array comprises a character array for a transformation algorithm that specifies the serialized byte array is handled as binary data.

20. The computer program product of claim 14, wherein the target hash value is calculated without canonicalizing the non-canonicalized serialized byte array.

\* \* \* \* \*